(12) United States Patent
Besuchet et al.

(10) Patent No.: US 12,204,285 B2
(45) Date of Patent: Jan. 21, 2025

(54) HOROLOGICAL MOVEMENT COMPRISING A GENERATOR

(71) Applicant: ETA SA Manufacture Horlogère Suisse, Grenchen (CH)

(72) Inventors: Romain Besuchet, Yverdon-les-Bains (CH); Stéphane Baleon, La Neuveville (CH); Pascal Lagorgette, Bienne (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 405 days.

(21) Appl. No.: 17/655,110

(22) Filed: Mar. 16, 2022

(65) Prior Publication Data
US 2022/0373976 A1 Nov. 24, 2022

(30) Foreign Application Priority Data

May 21, 2021 (EP) ..................................... 21175370

(51) Int. Cl.
*G04C 10/00* (2006.01)
*G04B 19/02* (2006.01)
(Continued)

(52) U.S. Cl.
CPC .............. *G04C 10/00* (2013.01); *G04B 19/02* (2013.01); *G04C 3/14* (2013.01); *H02K 7/116* (2013.01);
(Continued)

(58) Field of Classification Search
CPC .......... G04C 10/00; G04C 3/14; G04B 19/02; H02K 7/116; H02K 7/1853; H02K 37/24
(Continued)

(56) References Cited

U.S. PATENT DOCUMENTS

| 5,581,519 A | 12/1996 | Hara et al. |
| 6,012,838 A | 1/2000 | Hara et al. |

(Continued)

FOREIGN PATENT DOCUMENTS

| CH | 704012 B1 * | 6/2016 | ............ G04B 45/02 |
| JP | 2007-147647 | 6/2007 | |

(Continued)

OTHER PUBLICATIONS

European Search Report issued Oct. 7, 2021 in European Application21175370.2, filed on May 21, 2021 (with English Translation of Categories of cited documents), 3 pages.
Korean Office Action issued Feb. 16, 2024 in Korean Patent Application No. 10-2022-0044021, 13 pages.

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

An electromechanical horological movement including an analogue time display device and provided with at least one electromechanical motor, to drive at least one indicator of the analogue time display, and a generator including a rotor and associated with an oscillating mass coaxial with the time display device, this horological movement including a first wheel provided with a shaft, coaxial with said indicator, which is guided in rotation, in a main embodiment, by a fixed cylindrical tube around which is rotatably mounted at least one cannon of the time display device. The first wheel is in meshing relation with the rotor of the generator and is fixedly connected to the oscillating mass, on the side opposite the analogue time display, so that this oscillating mass can rotate the rotor of the generator via the first wheel.

9 Claims, 6 Drawing Sheets

(51) Int. Cl.
 *G04C 3/14* (2006.01)
 *H02K 7/116* (2006.01)
 *H02K 7/18* (2006.01)
 *H02K 37/14* (2006.01)
 *H02K 37/24* (2006.01)

(52) U.S. Cl.
 CPC ........... *H02K 7/1853* (2013.01); *H02K 37/14* (2013.01); *H02K 37/24* (2013.01)

(58) Field of Classification Search
 USPC ........................................................ 368/204
 See application file for complete search history.

(56) References Cited

U.S. PATENT DOCUMENTS

| | | |
|---|---|---|
| 6,120,177 A | 9/2000 | Hara et al. |
| 2004/0027923 A1* | 2/2004 | Ono ........................ G04F 8/02 368/106 |
| 2006/0245304 A1 | 11/2006 | Maruyama et al. |
| 2010/0220559 A1 | 9/2010 | Galie et al. |

FOREIGN PATENT DOCUMENTS

| | | | | |
|---|---|---|---|---|
| JP | 2007147647 A | * | 6/2007 | ................ G04C 3/12 |
| WO | WO-9719391 A1 | * | 5/1997 | ......... G04B 31/0123 |

* cited by examiner

HOROLOGICAL MOVEMENT COMPRISING A GENERATOR

CROSS-REFERENCE TO RELATED APPLICATION

This application claims priority to European Patent Application No. 21175370.2 filed on May 21, 2021, the entire disclosure of which is hereby incorporated herein by reference.

TECHNICAL FIELD OF THE INVENTION

The present invention relates to a horological movement provided with an analogue time display and comprising at least a part consuming an electric current, this horological movement further comprising a generator/micro-generator (hereafter named 'generator') capable of producing electrical energy in order to be able to power supply said part consuming an electrical current.

TECHNOLOGICAL BACKGROUND

Document EP 0 998 009 describes, in a first embodiment, a horological movement equipped with a generator whose rotor is coupled directly to an oscillating mass. The oscillating mass is fastened by a screw to a wheel in meshing relation with the rotor of the generator. For example, it is expected that the geartrain between the oscillating mass and the rotor has a multiplication by 100 of the speed of rotation. No technical explanation is given as to the arrangement of the oscillating mass in the horological movement. Documents U.S. Pat. Nos. 5,822,278 and 6,320,822 propose a similar arrangement for the generator and indicate that the analogue display is driven by an independent motor, this assembly being represented independent of the assembly formed by the generator and the oscillating mass, without any particular disclosure as to mounting the oscillating mass in the horological movement. Document EP 0 326 312, in the name of the same holder, shows in section, in its FIG. 2(a), a technical teaching as to the arrangement of the 'generator and oscillating mass assembly associated with a first geartrain' and of the 'electric motor and analogue display with three coaxial hands combined with a second geartrain'. According to this technical teaching, the seconds hand is pivoted downwards in a bridge 12. Under this bridge is provided another bridge 13 wherein is arranged a ball bearing. The oscillating mass is fastened by a screw to the central part of the ball bearing which can rotate. To transmit the force torque to the rotor of the generator, a central wheel integral with the oscillating mass is arranged between the bridge 13 and the disc of the oscillating mass, this central wheel meshing with a pinion arranged at the same level. This arrangement is bulky and complex with a stack of several wheels, a lower bearing for the seconds wheel arranged in an intermediate bridge, a ball bearing arranged in a lower bridge and, in addition, a central wheel between the lower bridge and the oscillating mass to be able to transmit, via an off-centre wheel set, the torque to the generator.

SUMMARY OF THE INVENTION

The present invention aims at providing an electromechanical movement provided with a generator which is less bulky, less complex and less expensive than the movement of the same type described in document EP 0 326 312 mentioned above. In particular, it is expected that the electromechanical movement according to the invention requires few modifications and no additional height relative to a conventional electromechanical movement having a central oscillating mass and an analogue time display with three hands which is also central.

To this end, the present invention relates to a horological movement of the electromechanical type comprising an analogue time display device and provided with at least one electromechanical motor, to drive at least one indicator of the analogue display, and a generator comprising a rotor and associated with an oscillating mass which is coaxial with the time display device. The horological movement comprises a first wheel provided with a shaft, coaxial with said indicator, which is guided in rotation by a cannon carrying this indicator and integral with a second wheel in meshing relation with the electromechanical motor or by a fixed cylindrical tube around which is rotatably mounted the cannon. According to the invention, the first wheel is in meshing relation with the rotor of the generator, this first wheel being fixedly connected to the oscillating mass on the side opposite the analogue display, so that this oscillating mass can rotate the rotor of the generator via the first wheel.

Thanks to the features of the invention, the central wheel fastened to the oscillating mass, to rotate the rotor of the generator via a first geartrain, is formed in a manner similar to a seconds wheel with a shaft guided in rotation, on the side of the analogue display, by a fixed cylindrical tube around which is rotatably mounted the cannon of the minute wheel or by this cannon itself. This arrangement allows to reduce the size of the horological movement, in particular to reduce its height/thickness. Preferably, the analogue display is provided without a seconds indicator which is coaxial with the minute indicator. However, in a particular embodiment which will not be described in detail later, provision is made of a seconds indicator coaxial with the minute indicator. In the latter case, the seconds indicator is then mounted on a cannon of a seconds wheel inside which is rotatably arranged said shaft of said central wheel, the cannon of the minute wheel then being mounted around the cannon of the seconds wheel.

According to the invention, it is further proposed to use a motor module of the electromechanical type comprising at least a first motor, formed of a permanent magnet rotor and a stator provided with at least one coil and associated with a first wheel provided with a shaft, and a second motor associated with at least a second wheel provided with a cannon intended to carry a minute indicator of an analogue time display, said shaft being guided in rotation by a fixed cylindrical tube around which said cannon is mounted or by this cannon itself and intended to carry in said motor module a seconds indicator or seconds counter, to form an electromechanical module comprising, on the one hand, at least one electromechanical motor, formed of said second motor, for driving an hour indicator and said minute indicator and, on the other hand, a generator formed by said permanent magnet rotor and said stator provided with said at least one coil, the first wheel being fixedly connected to an oscillating mass arranged under said electromechanical module, coaxially to this first wheel, in order to be able to rotate the rotor of the generator.

BRIEF DESCRIPTION OF FIGURES

The invention will be described below in more detail using the appended drawings, given by way of non-limiting examples, wherein.

DETAILED DESCRIPTION OF THE INVENTION

With reference to the appended figures, an embodiment according to the invention will be described below.

The horological movement 2 of the electromechanical type comprises an electromechanical module 4, an electronic module 6 to perform various functions and control the electromechanical module, a control module 8 associated with a stem-crown 10 to perform in particular a time setting of an analogue display 16 whose minute hand 18 and hour hand 17, coaxial and having a central axis of rotation 56, are respectively rotated, via two independent geartrains, by two electromechanical motors 12 and 14 of the electromechanical module 4. The hands 17 and 18 are respectively mounted on two elongated cannons 25 and 26 which are aligned on the axis of rotation 56, the cannon 26 being located inside the cannon 25 which is guided in rotation by this cannon 26. The cannon 26 is guided in rotation by a cylindrical tube 30 which is arranged inside this cannon 26 and fastened, at one end, to a bridge 32 of the electromechanical module 4, which further comprises a plate 50 on which are mounted the various elements of this module. Above the plate is provided a dial 52 wherein at least one digital display can be arranged, this dial then being electrically connected to the electronic module 6.

Figure 3A:
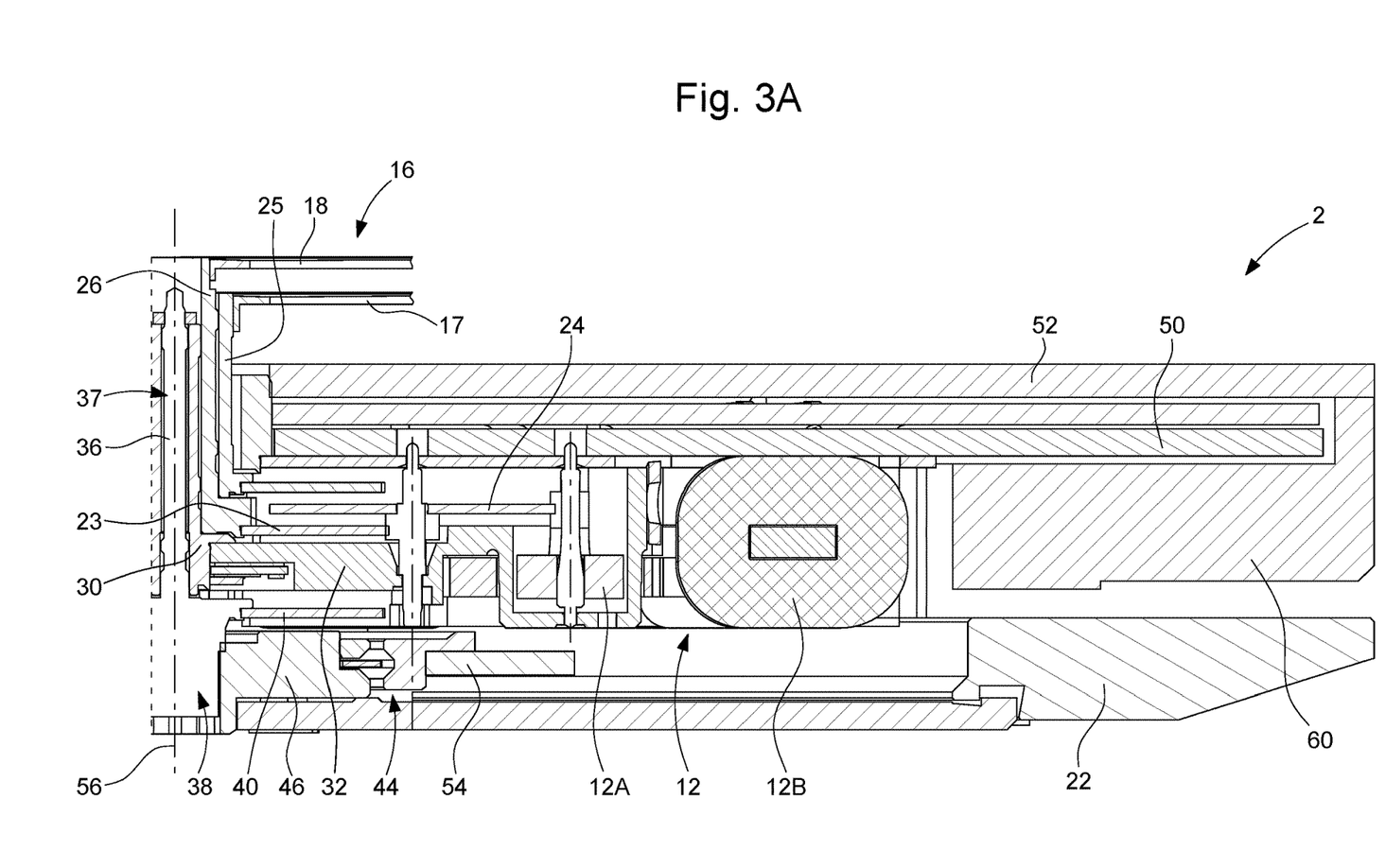
FIGS. 3A and 3B are respectively two parts of a cross section of the horological movement of FIGS. 1 and 2 along a broken line to show various elements of the electromechanical module of this horological movement.

The section of FIG. 3A shows the electromechanical motor 12, in particular a stepper motor of the Lavet type, which comprises a rotor 12A provided with a permanent magnet and a coil 12B mounted on a magnetic circuit forming a stator having two magnetic poles around the rotor magnet 12A. It is also possible to see the geartrain between the rotor 12A and the minute hand 18, this geartrain comprising a central wheel 23 fastened to the elongated cannon 26 carrying the minute hand, a wheel set 24 whose wheel meshes with a pinion of the rotor and whose pinion meshes with the central wheel 23, also called the second wheel.

Figure 3B:
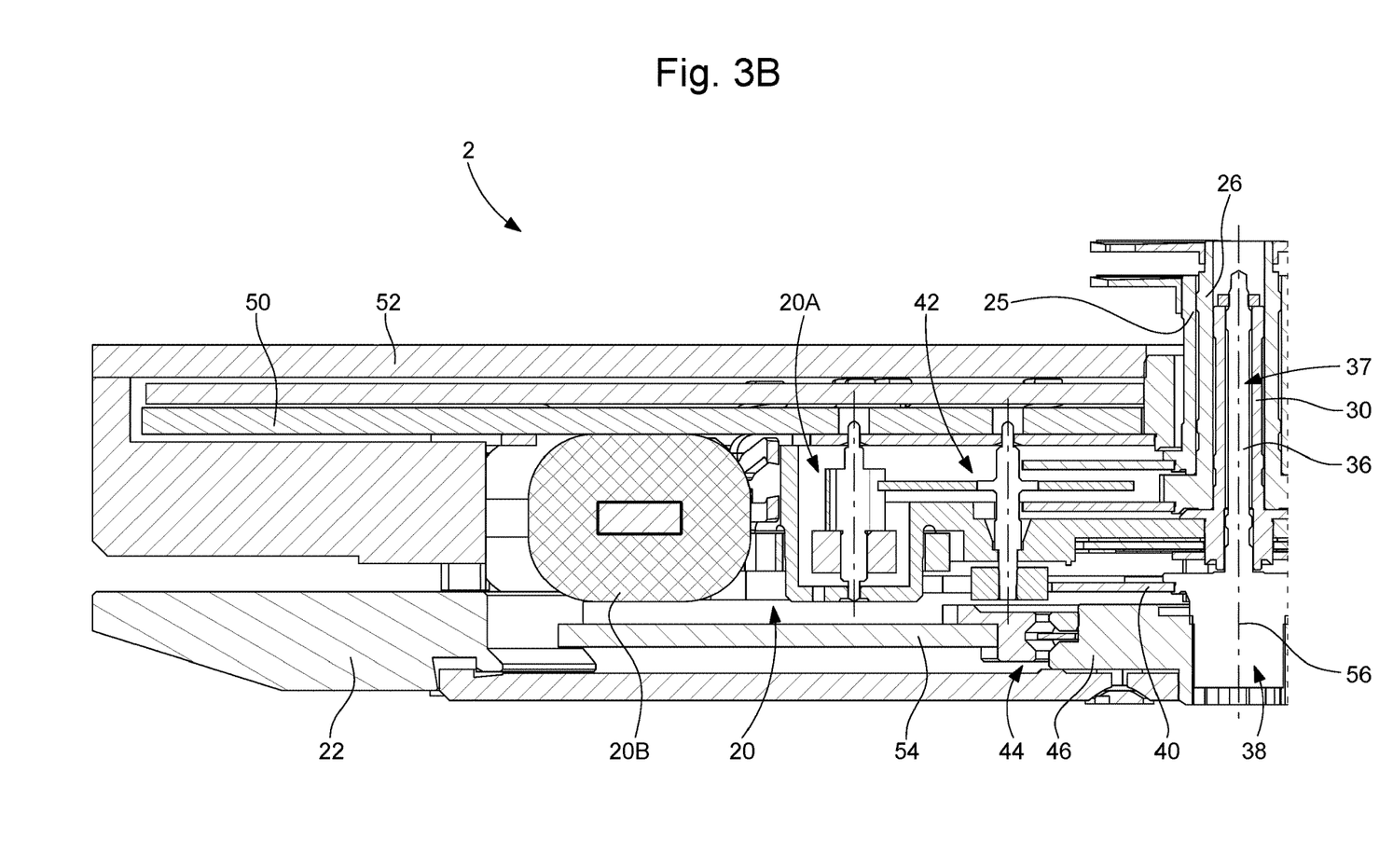

As shown in the section of FIG. 3B, the electromechanical module 4 further comprises a generator 20 formed of a rotor 20A and a coil 20B which is conventionally mounted on a ferromagnetic core of a stator defining a magnetic circuit with two magnetic poles (pole shoes) which surround the bipolar permanent magnet of the rotor 20A. Preferably, the magnetic circuit, in particular its two pole shoes, are configured so as to generate a low reluctant torque for the rotor of the generator, in particular by eliminating the positioning notches often provided in stepper motors. In order for the electromechanical movement to be autonomous in terms of its supply of electrical energy, by being capable of producing electrical energy from accelerations to which the watch equipped with such a horological movement may be subjected, in particular by movements of a user's arm, the generator 20 is associated with an oscillating mass 22 which is coaxial with the time display device.

The generator 20 is kinematically connected to the oscillating mass 22 in a way that allows to keep a relatively simple electromechanical module 4 and to have a lesser increase in thickness of the movement following the addition of the oscillating mass provided coaxial with the analogue time display to rotate the generator. For this purpose, the generator is kinematically connected to the oscillating mass via a wheel 40, also called the first wheel, and an intermediate wheel set 42 arranged between this wheel 40 and the rotor 20A of the generator, the wheel 40 being provided with a shaft 36 which is coaxial with the two cannons 25 and 26 of the two hands 17 and 18 and which is guided in rotation by a fixed cylindrical tube 30 wherein an axis 37 partially forming the shaft 36 is located. Thus, the shaft 36 of the first wheel 40 is not pivoted in a bearing on the analogue display side. Moreover, the fixed cylindrical tube 30 is, as already indicated, also used to guide in rotation the two respective cannons of the minute and hour hands. There is therefore a saving in material means thanks to the arrangement according to the invention.

The shaft 36 comprises a lower part 38 which extends the axis 37 in the direction of the central part 46, which is movable in rotation, of a ball bearing device 44 which is mounted on an additional bridge 54. This lower part 38 has a diameter greater than that of the axis 37 and is fastened to the central part 46, to which the oscillating mass 22 is also fastened. The first wheel 40 is therefore fixedly connected to the oscillating mass 22 on the side opposite the cylindrical tube 30, so that this oscillating mass is in meshing relation with the rotor 20A of the generator 20 and can thus rotate the generator via this first wheel. It will be noted that the first wheel 40 is fastened to the oscillating mass 22 without arranging a bearing specific to this first wheel on the side of this oscillating mass, so that the first wheel is not associated with any specific pivot bearing.

In a variant not shown, the fixed cylindrical tube 30 is omitted. Thus, the elongated cannon 26, which carries the hand/indicator 18, directly surrounds the axis 37 of the shaft 36 of the first wheel 40 and it is this cannon which then guides in rotation, on the side of the display, the first wheel 40 which is kinematically coupled to the generator 20.

Figure 4A:
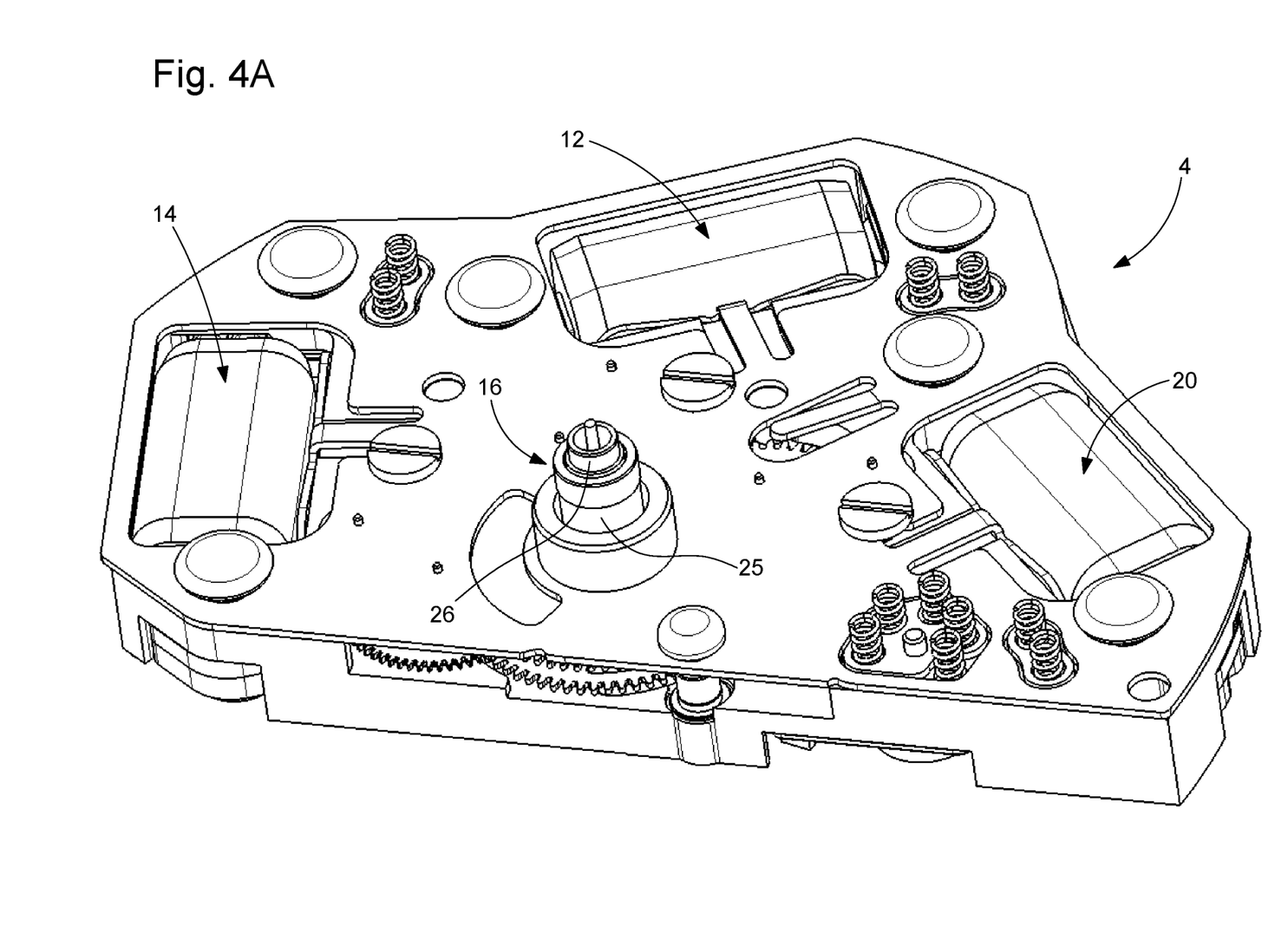
FIGS. 4A and 4B are perspective views of an electromechanical module forming the horological movement of the previous figures.
Figure 4B:
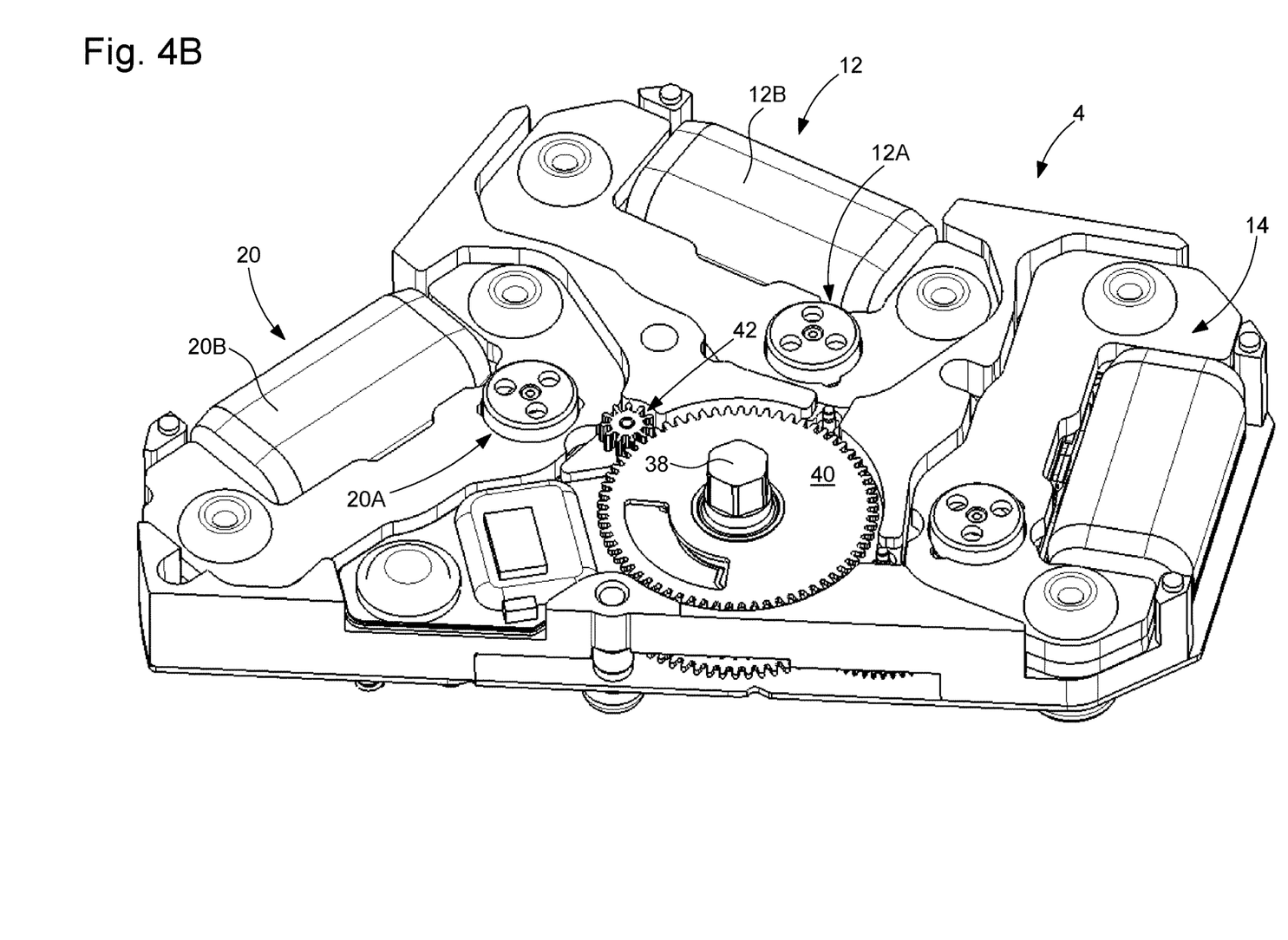

The electromechanical motor 12, the generator 20, a first geartrain comprising at least a first wheel 40 and kinematically coupling the oscillating mass 22 to the rotor of the generator, and a second geartrain comprising at least a second wheel 23 and kinematically coupling the electromechanical motor to at least one indicator of the analogue display, together form a separate electromechanical module 4 which is arranged in the horological movement 2 in a removable manner. This module 4 is shown in perspective in FIGS. 4A and 4B, FIG. 4A being a top view while FIG. 4B is a bottom view. These Figures and the preceding description show a remarkable feature of the invention, namely that the generator and the first geartrain which kinematically connects it to the oscillating mass have an arrangement corresponding substantially to that of an electromechanical motor driving a seconds hand in a conventional motor module wherein this seconds hand, coaxial with the minute and hour hands, is driven independently from these minute and hour hands and is, to this end, associated with its own geartrain, named above 'first geartrain'. As a general rule, since a stepper motor, in particular of the Lavet type, performs two steps per revolution, the transmission factor between the seconds wheel and the rotor of the motor in question is equal to thirty, so that the seconds hand successively performs jumps each corresponding to one second. Thus, in an advantageous variant of the invention, the transmission ratio between the central wheel 40 and the rotor 20A of the generator is provided equal to thirty in order to be able to use a motor module by minimally modifying it. However, in a general variant, this transmission ratio is comprised between ten and one hundred.

In the context of the invention, provision is therefore made for the use of a motor module of the electromechanical type comprising at least a first motor, formed of a permanent magnet rotor and a stator provided with at least one coil and associated with a first wheel provided with a shaft, and a second motor associated with at least a second wheel provided with a cannon intended to carry a minute indicator of an analogue time display, said shaft being guided in rotation by a fixed cylindrical tube around which is mounted said cannon or by this cannon itself and intended to carry in said motor module a seconds indicator or seconds counter, to form an electromechanical module according to the invention which comprises, on the one hand, at least one electromechanical motor, including the second motor, for driving an hour indicator and said minute indicator and, on the other hand, a generator formed by said permanent magnet rotor and said stator provided with said at least one coil. According to the invention, the shaft of the first wheel is extended on the side opposite the analogue time display and fixedly connected to an oscillating mass arranged under said electromechanical module, coaxially with this first wheel, in order to be able to rotate the rotor of the generator.

Figure 1:
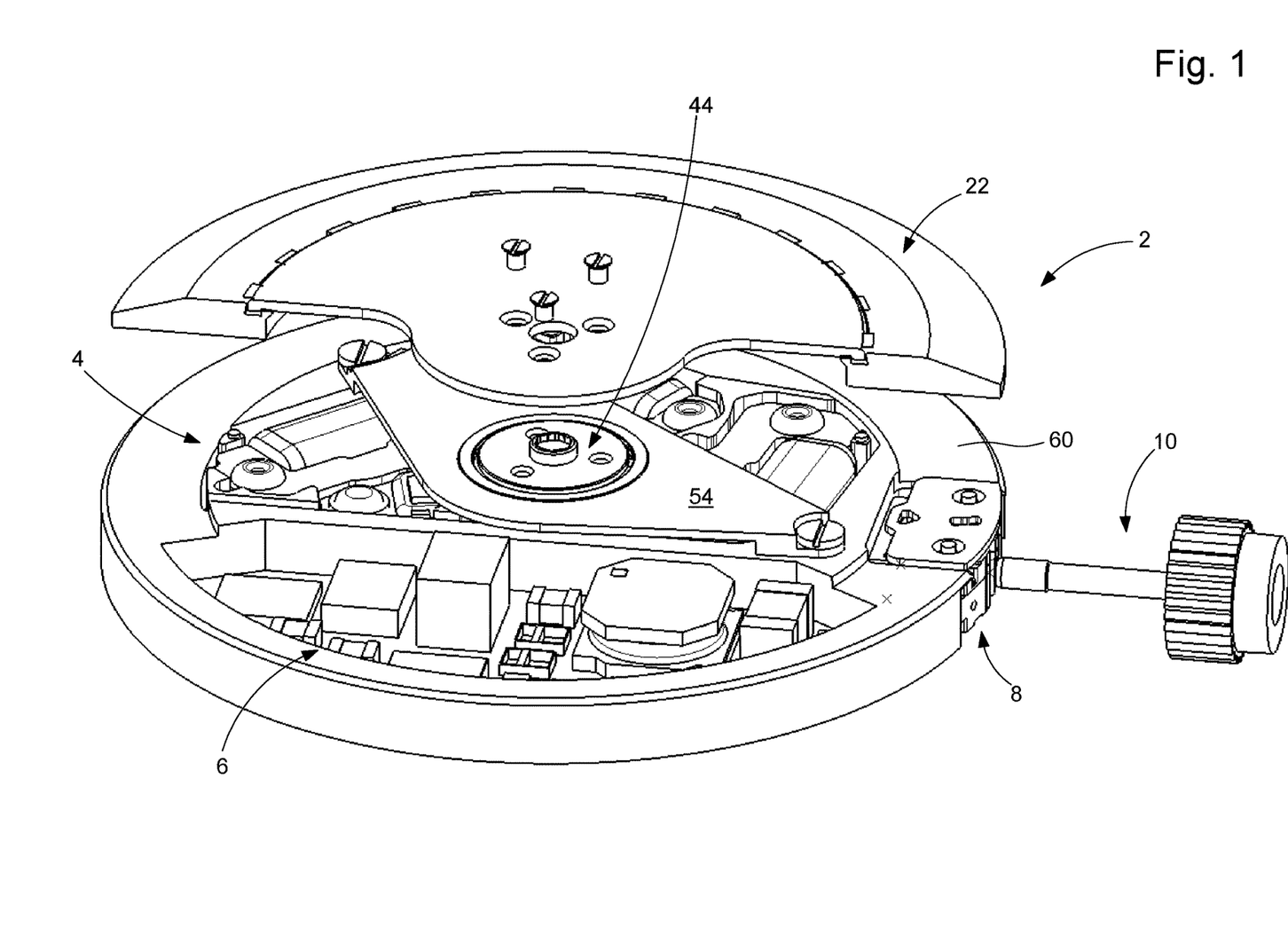
FIG. 1 is a bottom perspective and partially exploded view of an embodiment of an electromechanical horological movement according to the invention.
Figure 2:
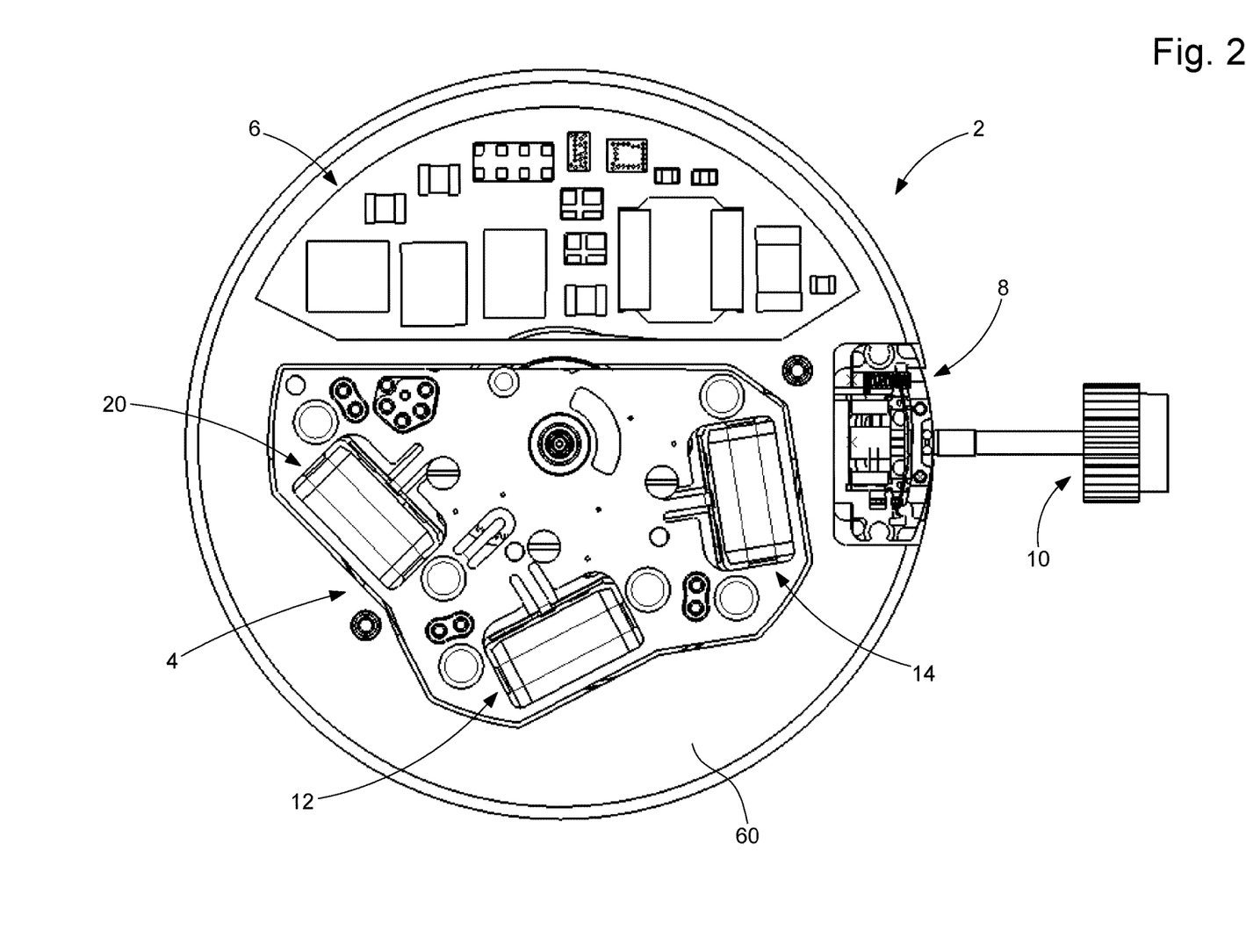
FIG. 2 is a top view of the horological movement of FIG. 1.

In a preferred variant, the oscillating mass 22 is fastened to a central part 46, which is movable in rotation, of a ball bearing device 44 which is arranged under the electromechanical module. To this end, provision is made of an additional bridge 54 which is fastened directly to the electromechanical module 4 to complete it or to a frame 60, for example made of plastic material, in a housing of which the electromechanical module is located (see FIG. 1). In this preferred variant, as already described previously, the shaft 36 of the first wheel 40 is not pivoted in a lower bearing in the electromechanical module, this first wheel being fastened to the oscillating mass 22 without arranging a bearing specific to this first wheel on the side of the oscillating mass, so that the first wheel is not associated with any specific bearing, which allows to maintain a relatively small thickness/height of the horological movement 2.

In a particular variant, the initial motor module used to produce the electromechanical module according to the invention comprises stators (ferromagnetic circuits) having positioning notches around the hole wherein the permanent magnet of the rotor is arranged so that the corresponding motors are of the stepper type. One of these stators is replaced by a stator without positioning notches which is then used to form the generator in the electromechanical module, so as to reduce a reluctant torque in the generator.

It is therefore noted that the present invention allows to start from a usual motor module for an electromechanical movement and to obtain the electromechanical module according to the invention with relatively little modification. Indeed, only the axis of the seconds wheel must be replaced by a shaft having a lower part, on the side of the oscillating mass, configured for a fastening to this oscillating mass or being completed with such a lower part which is adapted for a fastening to the oscillating mass, which is added to drive the generator.

The invention claimed is:

1. A horological movement comprising:
    an analogue time display device;
    an electromechanical motor configured to drive an indicator of the analogue display;
    a generator comprising a rotor and associated with an oscillating mass which is coaxial with the analogue time display device; and
    a first wheel provided with a shaft, coaxial with said indicator, which is guided in rotation by a cannon carrying said indicator and integral with a second wheel in meshing relation with the electromechanical motor or by a fixed cylindrical tube around which is rotatably mounted said cannon,
    wherein the first wheel is in meshing relation with the rotor of the generator, and
    wherein on a side opposite the analogue time display, the first wheel is fixedly connected to the oscillating mass so that said oscillating mass can rotate the rotor of the generator via the first wheel.

2. The horological movement according to claim 1, wherein the oscillating mass is fastened to a central part, which is movable in rotation, of a ball bearing device.

3. The horological movement according to claim 1, wherein the first wheel is fastened to the oscillating mass without arranging a bearing specific to said first wheel on the side of said oscillating mass, so that the first wheel is not associated with any specific pivot bearing.

4. The horological movement according to claim 1, wherein the electromechanical motor, the generator, a first geartrain comprising the first wheel and kinematically coupling the oscillating mass to the rotor of the generator, and a second geartrain comprising the second wheel and kinematically coupling the electromechanical motor to said indicator together form an electromechanical module which is separate from the other parts of the horological movement and arranged in said horological movement in a removable manner.

5. The horological movement according to claim 1, wherein a transmission ratio between the first wheel and the rotor of the generator is equal to thirty.

6. An electromechanical motor module comprising:
    a first motor formed of a permanent magnet rotor and a stator provided with a coil and associated with a first wheel provided with an axis;
    a second motor associated with a second wheel provided with a cannon intended to carry a minute indicator of an analogue time display, said axis being guided in rotation by a fixed cylindrical tube, around which said cannon is mounted, or directly by said cannon and intended to carry in said motor module a seconds indicator or seconds counter, to form an electromechanical module comprising an electromechanical motor, formed of said second motor, for driving an hour indicator and said minute indicator; and
    a generator formed by said permanent magnet rotor and said stator provided with said coil, the first wheel being fixedly connected to an oscillating mass which is arranged under said electromechanical module, coaxially to said first wheel, in order to be able to rotate the rotor of the generator.

7. The electromechanical motor module according to claim 6, wherein the oscillating mass is fastened to a central part, which is movable in rotation, of a ball bearing device which is arranged under the electromechanical module.

8. The electromechanical motor module according to claim 7, wherein the axis of the first wheel is a shaft fastened to the oscillating mass, said first wheel being fastened to the oscillating mass associated with said electromechanical module without arranging a bearing specific to said first wheel on a side of said oscillating mass, so that the first wheel is not associated with any specific bearing.

9. The electromechanical motor module according to claim 6, wherein said stator includes a first stator including positioning notches and a second stator without positioning notches.

* * * * *